(12) United States Patent
Patel et al.

(10) Patent No.: US 9,886,511 B2
(45) Date of Patent: Feb. 6, 2018

(54) PROVISIONING AND RENDERING LOCAL LANGUAGE CONTENT BY A SERVER CACHING A CONTENT PRESENTATION ENGINE TO A USER DEVICE

(75) Inventors: Ankitkumar Patel, Maharashtra (IN); Satish Mohan, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 1269 days.

(21) Appl. No.: 13/346,248

(22) Filed: Jan. 9, 2012

(65) Prior Publication Data

US 2013/0179145 A1  Jul. 11, 2013

(51) Int. Cl.
*G06F 17/28* (2006.01)
*G06F 17/00* (2006.01)
*G06F 17/30* (2006.01)
*G06F 17/24* (2006.01)

(52) U.S. Cl.
CPC ...... *G06F 17/30867* (2013.01); *G06F 17/289* (2013.01); *G06F 17/24* (2013.01); *G06F 17/30864* (2013.01); *G06F 17/30905* (2013.01)

(58) Field of Classification Search
CPC .. G06F 17/289; G06F 17/30669; G06F 17/24; G06F 17/30864; G06F 17/30905; G06N 5/04

USPC ............................................................ 704/3
See application file for complete search history.

(56) References Cited

U.S. PATENT DOCUMENTS

| | | | |
|---|---|---|---|
| 6,623,529 B1* | 9/2003 | Lakritz | 715/205 |
| 8,082,142 B2* | 12/2011 | Maegawa | 704/2 |
| 8,639,701 B1* | 1/2014 | Lim | G06F 17/30669 707/748 |
| 2007/0136222 A1* | 6/2007 | Horvitz | G06N 5/04 706/45 |
| 2012/0253814 A1* | 10/2012 | Wang | G06F 17/30905 704/260 |

* cited by examiner

*Primary Examiner* — Farzad Kazeminezhad
(74) *Attorney, Agent, or Firm* — Lowenstein Sandler LLP (57) ABSTRACT

A method and system for facilitating the rendering of content by a web service in a local language associated with the user device. The system includes a server configured to receive, from the web service, a request including a locale identifier and user-inputted content received from the user device. The server identifies one or more language parameters based on the locale identifier. In an embodiment, the system provides the language parameters and a content presentation engine to the web service for dynamically rendering the user-inputted content to the user device according to the one or more language parameters. In another embodiment, the server caches a content presentation engine and the language parameters to the user device for rendering content generated by the web service.

10 Claims, 5 Drawing Sheets

PROVISIONING AND RENDERING LOCAL LANGUAGE CONTENT BY A SERVER CACHING A CONTENT PRESENTATION ENGINE TO A USER DEVICE

TECHNICAL FIELD

Embodiments of the present invention relate to computing systems, and more specifically, to a cloud-based service framework for facilitating the provisioning of content to a user in accordance with local language rules and content provider style parameters.

BACKGROUND

With the expansion of the Internet and global reach of many web services, content providers continually face the growing challenge of delivering content to users and user devices in an understandable and appropriate language and preferred format and style. In this regard, local language computing is a precursor to bridging the persisting digital divide. Without local language solutions, many rural and underdeveloped non-English speaking areas of the world will remain isolated from the information and innovation available on the Internet.

In order to reach a geographically diverse user base, web services (e.g., websites and web-based applications) wishing to display content in the language local to a user must either maintain an expansive library of languages along with a mechanism to present the appropriate local language to the user or rely on the user to have the necessary language tools stored local on the user device.

Yet another problem facing web services developers is the inability to allow users to input content in the web service in the user's local language. Again, to collect data in multiple languages requires the user device to have the appropriate language mechanisms installed locally on the user device.

In addition, web service developers also wish to display their content to the user in a particular format and style (e.g., font type, font size, font weight). However, users often "see" the content differently than what was intended by the developer when the user device does not have a required tool to display the content in the intended format. For example, a web service may wish to display content in a particular font having a specific size and weight, however the user device must have the capability to recognize and display the specified font and style. This is a significant limitation since many user devices, particularly those in underdeveloped countries, lack robust font and style presentation options and functionality.

Moreover, in many instances, web service developers are unable to present content in an intended format without conflicting with certain local language conditions including formation and grammar rules. As such, developers are unable to satisfy both their presentation requirements and the applicable local language rules when validating user-inputted content provided to the web service. As the global reach of web services and the emergence of user devices expands, efficient delivery of content in a format and style selected by the developer in a language appropriate for the user continues to be a priority.

DETAILED DESCRIPTION

Methods and systems for rendering content associated with a web service to a user device. The language services system and method provides a flexible cloud-based framework configured to support existing and new web services and multiple living and non-living languages.

The language services framework facilitates the provisioning of content generated by a web service and user-generated content to a user device in a language and format that is based on the location of the user device. In an embodiment, the language services framework is implemented by a language services server having an associated language parameter data store. The language services server maintains language parameters including multiple locale-specific language files. Each locale-specific language files include one or more language parameters that are customized to the corresponding locale. The language parameters include information that defines, governs, determines, and/or formats the language and appearance of content to be displayed on a user device. Exemplary language parameters include, but are not limited to, a language file, one or more font definitions, a keyboard layout file, grammar rules, and formulation rules.

The language services server is communicatively connected to multiple web services via a network. As used herein, the term "web services" includes, but is not limited to, any application (e.g., Web-based or native to a device) accessible by a user device via a network. As used herein, a user device includes any computing device configured to connect to a web service, such as, for example, a mobile device (e.g., a phone), tablet, desktop computer, laptop computer, eBook reader, PDA, and the like. The language services framework may integrate or connect with any web service via a suitable application programming interface (API).

The language services framework provides web services with a content presentation engine enabling the delivery and presentation of content to a user device in the user device's local language. Advantageously, the content presentation engine and local language parameters provide the web service with a local language file (i.e., a file enabling the generation and display of content in the user device's local language), local language fonts, tools for collecting user-inputted content such as a local language-based onscreen keyboard, and tools for validating user-inputted content such as grammar rules, formulation rules, and spell-check rules.

In one embodiment, the language services framework receives a request from a web service for language support in connection with the delivery of content to a user device. The content may include both application content and user-inputted content. Application content is any data generated by the web service, including but not limited to the static content presented by the web service to the user. The user-inputted content is any content that is entered by the user during an interaction with the web service. The content may be in any suitable format or protocol, such as, for example, UCS Transformation Format-8 bit (UTF-8) encoded data.

In an embodiment, the web service determines whether the user-inputted content is in a language which is supported by the web service (i.e., a supported language) or a language that is not supported by the web service (i.e., a non-supported language). If the user-inputted content is in a non-supported language then, in response to receipt of the user-inputted content, a web service client automatically sends a request to the web service, which in turn sends a request to the language services framework.

The web service request includes a locale identifier which uniquely identifies the locale of the user device and is used by the language services framework to identify an appropriate language parameter file from a language parameter data store. Exemplary locale identifiers may include en, en_AU, en_GB, hi_IN, ar, and ar_YE. The language services server communicates with the language parameter data store configured to store multiple language parameter files, each associated with a particular locale. In an embodiment, the language parameter file includes one or more language parameters for the language associated with the user device's locale, such as, for example, a language file (i.e., a file including code configured to identify, read, interpret, translate, present, and/or recognize characters and words of a language), a font definition file, grammar rules, formulation rules, and a keyboard layout file.

Based on the locale identifier, the language services framework identifies one or more language parameters. Next, the language services framework identifies the appropriate language rules based on the locale identifier and enables the content presentation engine associated with the identified language parameters. The content presentation engine includes any computer-readable set of instructions relating to the generation and presentation of content in accordance with one or more language parameters. The content presentation engine, may include, but is not limited to, a program, a software package (e.g., web service authenticator, web service session manager, language identifier, script grammar processor, font provider, content formatter, offline client library), a script (e.g., identify client device script, identify client browser script, identify content origin script), and a client side cache store (e.g., font cache, formatting rules, language preference). In an embodiment, upon execution, the content presentation engine is programmed to receive the one or more identified language parameters and content and generate re-formatted content in the local language of the user device.

In an embodiment, the content presentation engine and the one or more identified language parameters are provided by the language services framework to the web service. In an embodiment, the session between the content presentation engine and the web service is authenticated through a unique application identifier key issued to the subscribed web service (i.e., an application identifier). Once the session is established the web service can query the language service framework for content processing. In an embodiment, the content (application content and user-inputted content) is domained by the web service and is not stored or maintained by the language services framework. Advantageously, provisioning the content presentation engine and the identified language parameters (e.g., the language file, the font file, the grammar rules) enables the web service to generate and display the web service's content to the user in the language that is local to the user device and in a format (e.g., font size, font style) selected by the web service. Moreover, the content presentation engine and language parameters may be applied to user-inputted content (e.g., comments, or any field entries) to provide web services with the ability to dynamically offer multiple languages to users, without having to independently maintain, store, update, or manage a vast language library.

In one embodiment, the web services and the language services framework communicate via standard API protocols, such as, for example, a RESTful web API or a SOAP API. In an embodiment, a request received from the web service's API includes a unique application identifier used by the language services framework to validate the request.

Accordingly, an efficient mechanism is provided that enables a web service to deliver and present application content and user-inputted content to multiple user devices in accordance with a user device's local language conditions and web service selected style parameters.

Figure 1:
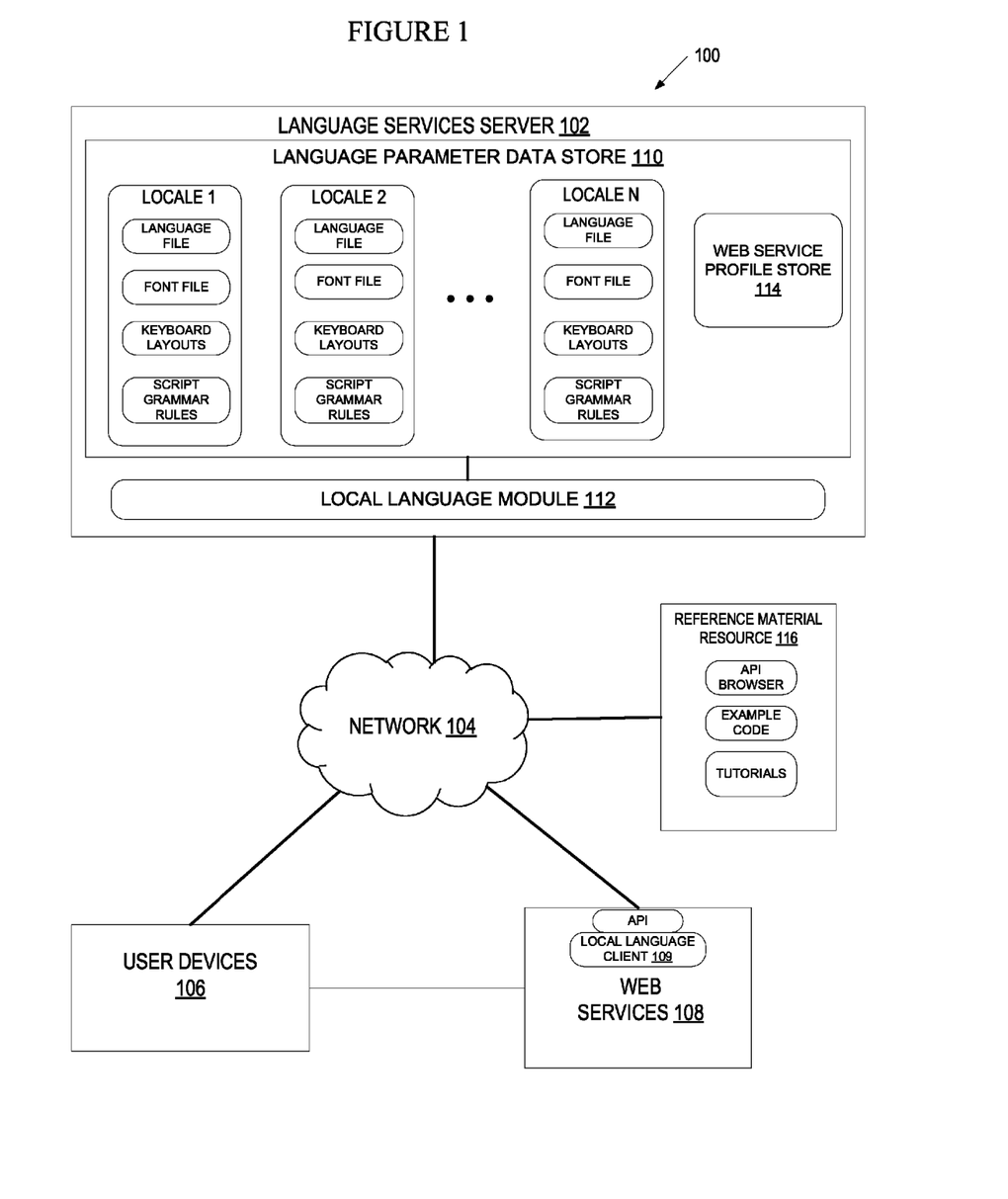
FIG. 1 is a block diagram of an exemplary network architecture in which embodiments of the invention may operate.

FIG. 1 is a block diagram of exemplary network architecture 100 in which embodiments of the invention may operate. The network architecture 100 may include a language services server 102 configured to implement a language services framework, according to embodiments of the present invention. The language services server 102 is communicatively connected to multiple user devices 106 and multiple web services 108 via a network 104 (e.g., a public network such as the Internet, a private network such as a local area network (LAN), or a virtual private network (VPN)). The user devices 106 may include any type of computing device such as, for example, a desktop computer, a portable digital assistant, a mobile phone, a laptop computer, a portable media player, a tablet computer, a netbook, a notebook, or a personal computer.

The language services server 102 includes a local language module 112 configured to provide language support to the multiple web services. A language parameter data store 110 maintains multiple language parameter files (e.g., the language parameter tiles labeled "Locale 1", "Locale 2", . . . "Locale N"). One having ordinary skill in the art will appreciate that the language parameter data store 110 may store any number of language parameter files, and may be expandable to include new language parameter files associated with newly identified locales. Each language parameter file provides language and location-based style parameters for a particular locale. In an embodiment, in operation, the local language module 112 receives a locale identifier in a request from a web service 108. The locale identifier represents a locale of the user device 106 involved in the interaction with the web service 108. The local language module 112 uses the locale identifier to identify the appropriate language parameter file for the user device's locale maintained in the language parameter data store 110.

In an embodiment, the web services 108 comprise a local language client 109. The local language client is hardware component, software component or combination of hardware and software configured to communicate with the user devices 106 and the local language module 112. The local language client 109 receives user-inputted content from one or more of the user devices, determines whether the content is in a non-supported language (i.e., a language not supported by the web service), and communicate with the local language module 112, via an API, in accordance with the exemplary process illustrated in FIG. 4 and described in detail below.

In an embodiment, the local language client 109 is configured to communicate with the local language module 112 in order to initiate the caching of a content presentation engine to a user device 106 rendering the web service's application content according to one or more language parameters, as illustrated in process flow shown in FIG. 3 and described in detail below.

In an embodiment, each locale-specific language parameter file includes one or more language parameters that are customized to the corresponding locale. The language parameters include information that defines, governs, determines, and/or formats the language and appearance of content to be displayed on a user device. As shown in FIG. 1, exemplary language parameters include, but are not limited to, a language file, one or more font files, a keyboard layout file, grammar rules, and formulation rules. One having ordinary skill in the art will appreciate that the language parameter file may include any combination of the exemplary parameters shown in FIG. 1, and may further include additional language parameters not provided in the exemplary list.

In an embodiment, the script grammar rules define the manner in which a script of a given language is to be written. The script grammar rules may include formulation rules, such as, for example, rules governing the manner in which ligatures are constructed in the case of Indian languages.

In an embodiment, the language file may include or be coupled to the Unicode Common Locale Data repository (CLDR) which provides building blocks for the support of multiple languages, such as for example, the adapting of software to the conventions of different languages including, but not limited to, the formatting of dates, times, and time zones, formatting numbers and currency values, sorting text, etc. One having ordinary skill in the art will appreciate that the CLDR may be maintained remotely from the language parameter data store 110, and accessible by the language file to retrieve updates, modifications, etc.

In an embodiment, the language parameter data store 110 also includes a web service profile store 114 configured to store web service profile information relating to the multiple web services supported by the language services server 102. The web service profile information may include one or more application identifiers to identify the one or more applications associated with the web service, style parameters associated with the web service (either at the web service or application level) and information suitable for use in validating the web service. In an embodiment, the application identifier is included in a request received from the web service 108. The local language module 112 receives the request and may utilize the web service profile store 114 to look up the application identifier to validate the web service 108 and determine any web service-specific style parameters.

The style parameters may include any rules, conditions, or preferences set by a web service relating to the style and format of the content presented to a user device. The style parameters may be designated by a web service and stored in the web service's profile in the web service profile store 114. For each style parameter, if the web service does not specify a value, a default value is assigned by the language services server 102.

In an embodiment, the style parameters may include a "validate entry" option relating to the validation of user-inputted content by application of the script grammar rules. If the validate entry option is enabled, the user-inputted content is validated against the appropriate language rules (e.g., the script grammar rules, CLDR, formulation rules, spell-check rules).

In an embodiment, the style parameters may include a keyboard identifier which identifies the type of keyboard being used by a user device for the input of content into the web service. In an embodiment, the style parameter may include a virtual keyboard identifier which identifies whether a virtual keyboard is to be displayed to the user device, and if so, the type of keyboard to be displayed.

The following table provides a list of exemplary style parameters, exemplary assignable values, and an exemplary default value. One having ordinary skill in the art will appreciate that any combination of style parameters (including additional style parameters not shown in the exemplary table below) and other assignable and default values may be maintained in the web service profile.

TABLE 1

Style parameters

| Style Parameter | Exemplary Assignable Values | Exemplary Default Value |
| --- | --- | --- |
| Input type | String, date, currency, month, weekday | string |
| Font identifier | A unique font definition may be established by a web service and assigned a unique font identifier | Default font assigned to the locale based on the locale identifier |
| Font style | Times New Roman. Arial. Garamond, etc. | Default font style assigned to the locale based on the locale identifier |
| Font size | 4 point, 6 point, 8 point, 10 point, 12 point, etc. | Default size assigned to the applicable font style |
| Font weight | 100-900 | Default weight assigned to the applicable font style |
| Validate entry | On or off | Off |
| Keyboard map | On or off | Off |
| Virtual keyboard | On or off | Off |

One having ordinary skill in the art will appreciate that although the language parameter data service 110 and the web service profile store 114 are shown schematically as a part of the language service server 102, one having ordinary skill in the art will appreciate that the language parameter data store 110 and/or the web service profile store 114 may be remote from, and accessible by, the language services server 102.

In an embodiment, the network architecture 100 may further include a reference material implementation resource 116 including materials and tools accessible by the language services server 102 and the web services 108 via the network 104. The reference material implementation resource 116 includes documentation providing support to the web services 108 in utilizing the language services framework. For example, the reference material implementation resource 116 may include documentation relating to use of the applicable API browser, example language support code, and various tutorials.

Figure 2:
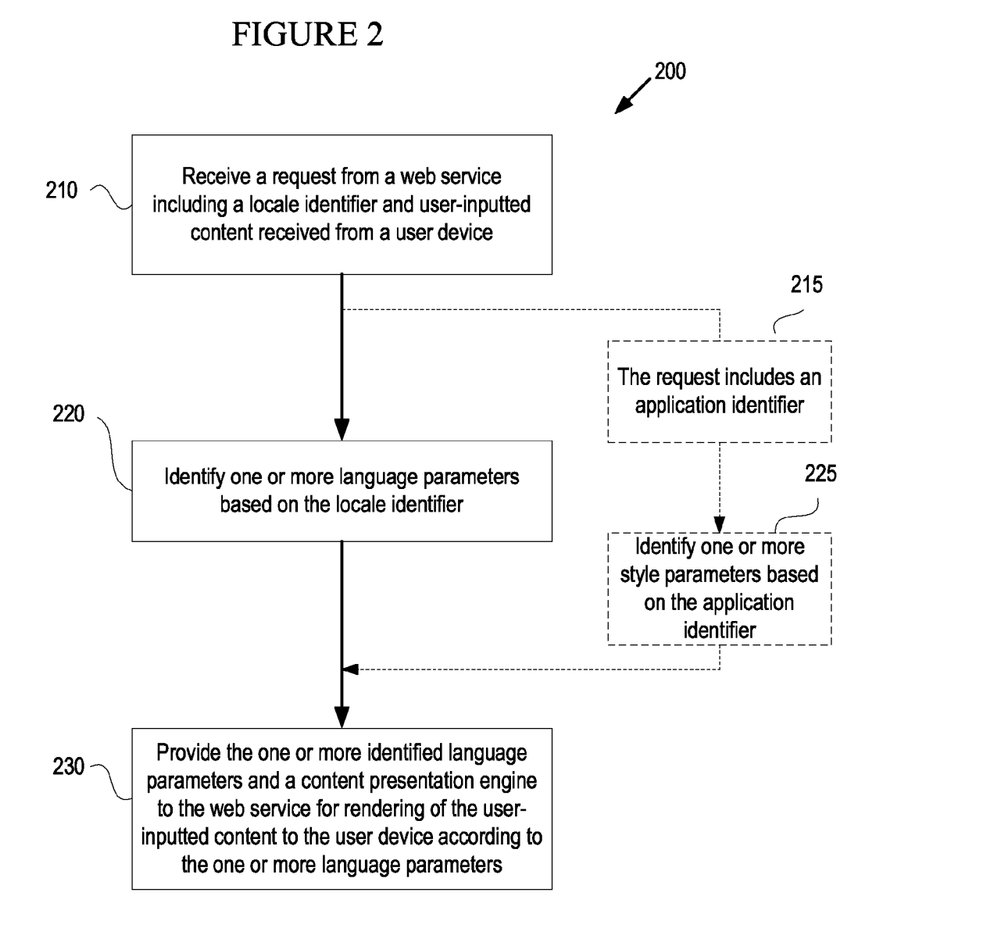
FIG. 2 is a flow diagram of an embodiment of a method for facilitating presentation by a web service of local language user-inputted content on a user device.

FIG. 2 is a flow diagram of an embodiment of a language services method 200 for facilitating rendering of content by a web service (e.g., web services 108). The method is performed by processing logic that may comprise hardware (circuitry, dedicated logic, etc.), software (such as is run on a general purpose computer system or a dedicated machine), or a combination of both. In one embodiment, the method is performed by a server (e.g., language services server 102 of FIG. 1).

Referring to FIG. 2, method 200 begins with a component of a server (e.g., local language module 112 of the language services server 102 of FIG. 1) receiving a request from a web service (e.g., web service 108 of FIG. 1) relating to the rendering content to a user device (e.g., user device 106 of FIG. 1) via the web service, in block 210. In an embodiment, the request includes a locale identifier associated with the user device and content inputted from the user device into the web service (i.e., the user-inputted content). The locale identifier indicates the locale of the user device associated with the request. Optionally, in an embodiment, the request includes an application identifier associated with the web service, in block 215. The application identifier is a unique code assigned to each web service which allows the server to validate the web service and identify the web service's associated web service profile. In the Figures, the optional nature of a block is denoted by a dashed box and dashed lines.

Based on the locale identifier, the server identifies one or more language parameters stored in a language parameter file (block 220). One having ordinary skill in the art will appreciate that the server may be programmed to identify and retrieve any combination of language parameters of the language parameter file. For example, the server may identify the language file, the script grammar rules, and the font file for the locale (e.g., Bangalore, India) associated with the user device involved in the interaction with the web service.

In an embodiment, following optional block 215, the server identifies one or more style parameters based on the application identifier (block 225). In block 225, the server uses the application identifier to retrieve the web service profile associated with the web service initiating the request, according to an embodiment of the present invention. The web service profile includes the style parameters associated with the web service, such as, for example, those shown in Table 1. In an embodiment, with reference to FIG. 1, the local language module 112 retrieves the web service profile from the web service profile store 114. In an embodiment, the server may also validate the request from the web service using the application identifier.

In an embodiment, the server identifies employs a content presentation engine to identify one or more language parameters stored in a language parameter file in the language data store based on the incoming locale identifier uses the selected language parameters to process the user-inputted content.

At block 230, the one or more identified language parameters and a content presentation engine are provided to the web service for rendering the user-inputted content to the user device in accordance with the one or more language parameters (and, optionally, the one or more style parameters). The web service may then execute the content presentation engine using the user-inputted content and the one or more language parameters to generate and display the user-inputted content in the language that is local to the user device. In an embodiment, the web service may utilize the content presentation engine and the language parameters to render the application content (i.e., the content that is generated by and native to the web service) to the user device in the user device's local language. Advantageously, the provisioning of the content presentation engine and the applicable language parameter(s) allows the content (both the application content and the user-inputted content) to reside at the web service, without storage by the server.

An exemplary implementation of the method 200 may include a web service such as a social network website that wishes to render content inputted by a user (herein "User 1") located in Talugu, India in the user's local language (i.e., the Dravidian language). In this example, the social network website does not store, maintain, or support the Dravidian language, and as such, the social network website utilizes the language services server to dynamically render the user-inputted content in the Dravidian language.

In operation, User 1 enters comments on the social network website in the Dravidian language. Upon receipt of the user-inputted content, the social network website sends a request to the language services server including a locale identifier associated with Talugu, India and the user-inputted content, at block 210. The language services server identifies one or more language parameters based on the local identifier and an associated content presentation engine configured to enable the rendering of the user-inputted content in the Dravidian language, in block 220. In block 230, the language services server provides the one or more identified language parameters and the content presentation engine to the social network website, and the user-inputted content is rendered to User 1 in the Dravidian language.

Figure 3:
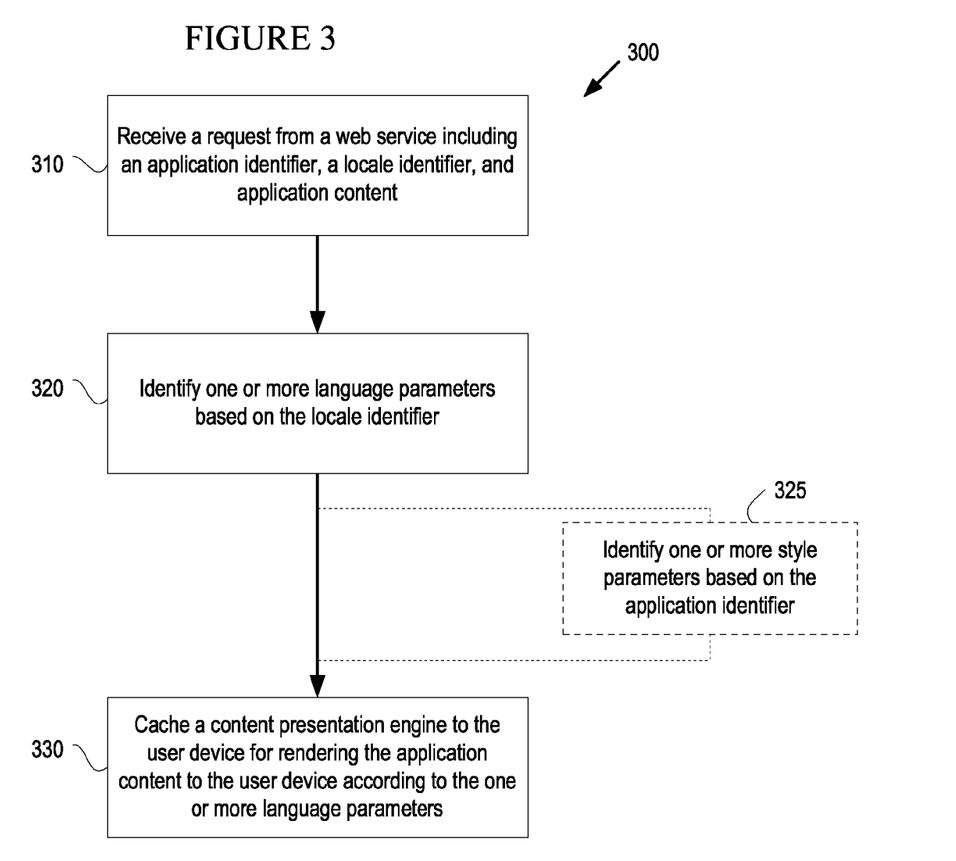
FIG. 3 is a flow diagram of an embodiment of a method for displaying content on a user device in accordance with local language parameters.

FIG. 3 is a flow diagram of an embodiment of a method 300 for rendering application content generated by a web service on a user device in the local language of the user device. The method is performed by processing logic that may comprise hardware (circuitry, dedicated logic, etc.), software (such as is run on a general purpose computer system or a dedicated machine), or a combination of both. In one embodiment, the method is performed by a component of a server (e.g., local language module 112 of the language services server 102 of FIG. 1).

Referring to FIG. 3, method 300 begins with the server (e.g., local language module 112 of the language services server 102 of FIG. 1) receiving a request from a web service relating to the rendering application content to a user device (e.g., user device 106 of FIG. 1) via the web service in the user device's local language, in block 310. In an embodiment, the request includes a locale identifier associated with the user device and content generated by the web service (i.e., the application content). The locale identifier is a unique code which indicates the locale of the user device associated with the request. Optionally, in an embodiment, the request includes an application identifier associated with the web service, in block 315. The application identifier is a unique code assigned to each web service which allows the server to validate the web service and identify the web service's associated web service profile.

Based on the locale identifier, the server identifies one or more language parameters stored in a language parameter file (block 320). One having ordinary skill in the art will appreciate that the server may be programmed to identify and retrieve any combination of language parameters of the language parameter file. For example, the server may identify the language file, the script grammar rules, and the font file for the locale (e.g., Bangalore, India) associated with the user device involved in the interaction with the web service.

In an embodiment, following optional block 315, the server identifies one or more style parameters based on the application identifier (block 325). In block 325, the server uses the application identifier to retrieve the web service profile associated with the web service initiating the request, according to an embodiment of the present invention. The web service profile includes the style parameters associated with the web service, such as, for example, those shown in Table 1. In an embodiment, with reference to FIG. 1, the local language module 112 retrieves the web service profile from the web service profile store 114. In an embodiment, the server may also validate the request from the web service using the application identifier.

In an embodiment, the server employs a content presentation engine to identify one or more language parameters stored in a language parameter file in the language data store based on the incoming locale identifier uses the selected language parameters to process the user-inputted content.

At block 330, the one or more identified language parameters and the content presentation engine are cached to the user device for rendering the application content to the user device in accordance with the one or more language parameters. The user device may then use the content presentation engine stored in cache to display the application content in the language that is local to the user device. Advantageously, method 300 dynamically downloads the appropriate language rendering tool (e.g., the content presentation engine) to a user device which does not already have a language rendering tool stored locally. According to method 300, a web service may use the language services server to provide the content presentation engine and required language parameters (and, optionally, the web service-selected style parameters) to the user device so that the application content can be rendered on the user device in a manner desired by the user (i.e., in the user's local language) and the web service (i.e., in accordance with the web service-selected style parameters).

A further advantage is achieved by method 300 in that neither the user device nor the web service needs to maintain language parameter libraries or style parameter libraries in their respective local storage. In an embodiment, this is particularly advantageous to web services configured to interact with user devices on a global scale, since such web services can avoid managing, tracking, and maintaining thousands of languages. Instead, the web service can generate the application content in a selected language, and utilize the local language framework according to embodiments of the present invention to provide the necessary content presentation engine and language parameters to facilitate rendering of the application content in a language appropriate manner. Furthermore, the provisioning of the content presentation engine and the applicable language parameter(s) allows the content (both the application content and the user-inputted content) to reside at the web service, without storage by the server.

For example, a web service such as a social network website may render application content (i.e., the content generated by the social network website) to a user operating a user device in instances where the user device is not equipped or configured to render the application content in the user device's local language. Continuing the example described above, the social network website that wishes to render application content to User 1 located in Talugu, India in the user's local Dravidian language. In this example, if the user device is not enabled to render content in accordance with the appropriate language parameters (and, optionally, style parameters of the social network website), the social network website can communicate with the language services framework to identify an appropriate content presentation engine and language parameters. The language services framework then caches the content presentation engine to the user device for rendering the application content in the Dravidian language in accordance with the identified language parameters.

Figure 4:
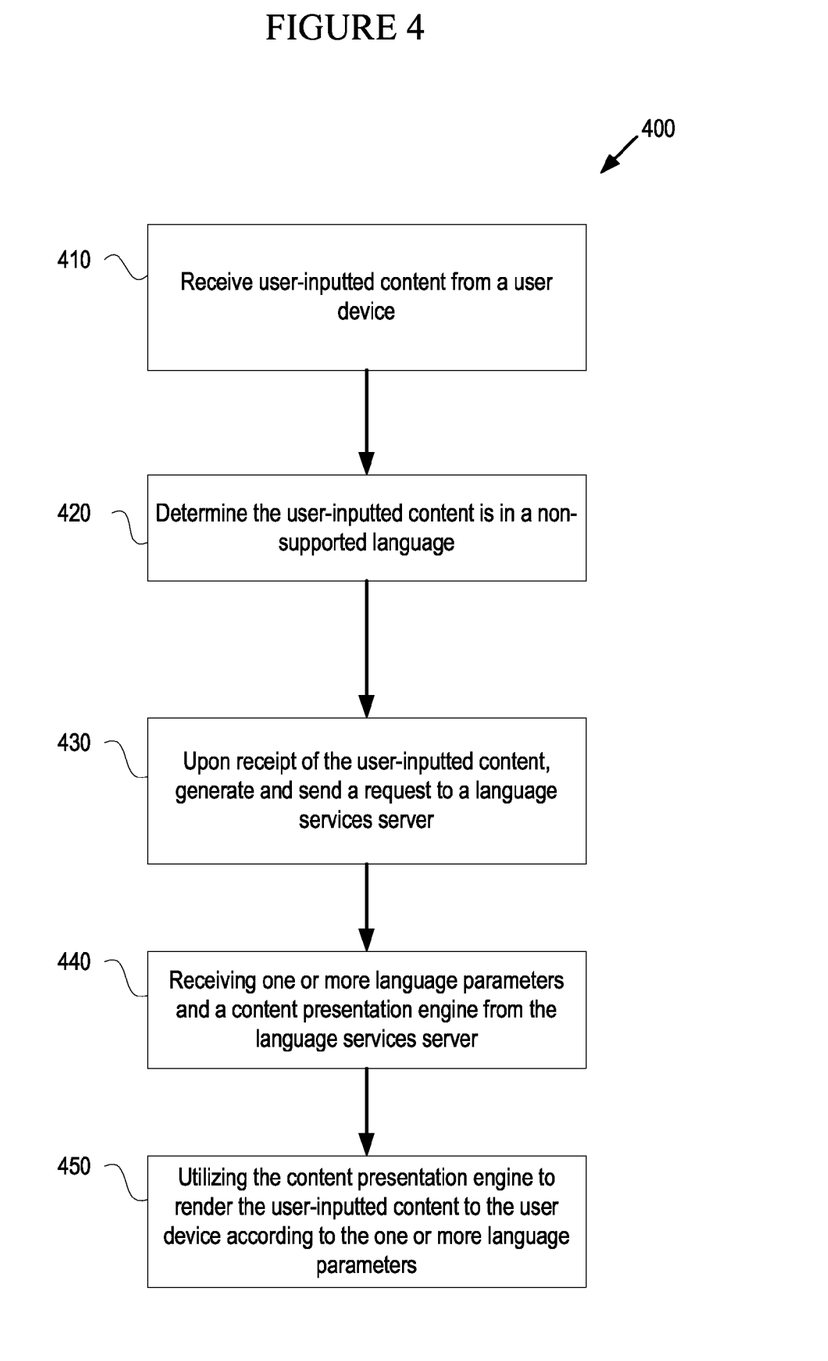
FIG. 4 is a flow diagram of a web service-side method for receiving user-inputted content and communicating with a language services framework.

FIG. 4 is a flow diagram of an embodiment of a method 400 for processing user-inputted content received from a user device (i.e., user devices 106 in FIG. 1) by a web service 108. The method is performed by processing logic that may comprise hardware (circuitry, dedicated logic, etc.), software (such as is run on a general purpose computer system or a dedicated machine), or a combination of both. In one embodiment, the method is performed by a local language client (e.g., local language client 109 of FIG. 1) of a web service (e.g., web services 108 of FIG. 1).

Referring to FIG. 4, method 400 begins with the web service (e.g., local language client 109 of the web service 108 of FIG. 1) receiving user-inputted content from a user device (e.g., user device 106 of FIG. 1), in block 410. The local language client 109 determines whether the user-inputted content is a supported language or a non-supported language. If the user-inputted content is in a supported language, then the web service process the user's interaction according to its normal procedures and renders the user-inputted content in the user's language. If, in block 420, the local language client 109 determines the user-inputted content is in a non-supported language, the local language client 109 dynamically generates and sends a request to a language services server (e.g., language services server 102 in FIG. 1) for the required language support, in block 430. In an embodiment, the request includes the user-inputted content and a locale identifier.

In block 440, the local language client 109 receives one or more language parameters and a content presentation engine determined by the language services server. In block 450, the local language client 109 utilizes the content presentation engine to render the user-inputted content to the user device (e.g., user device 108 in FIG. 1) according to the one or more language parameters. Advantageously, the local language client 109 dynamically presents the user-inputted content in the local language associated with the user device, without having to locally maintain, manage or support that particular local language.

Figure 5:
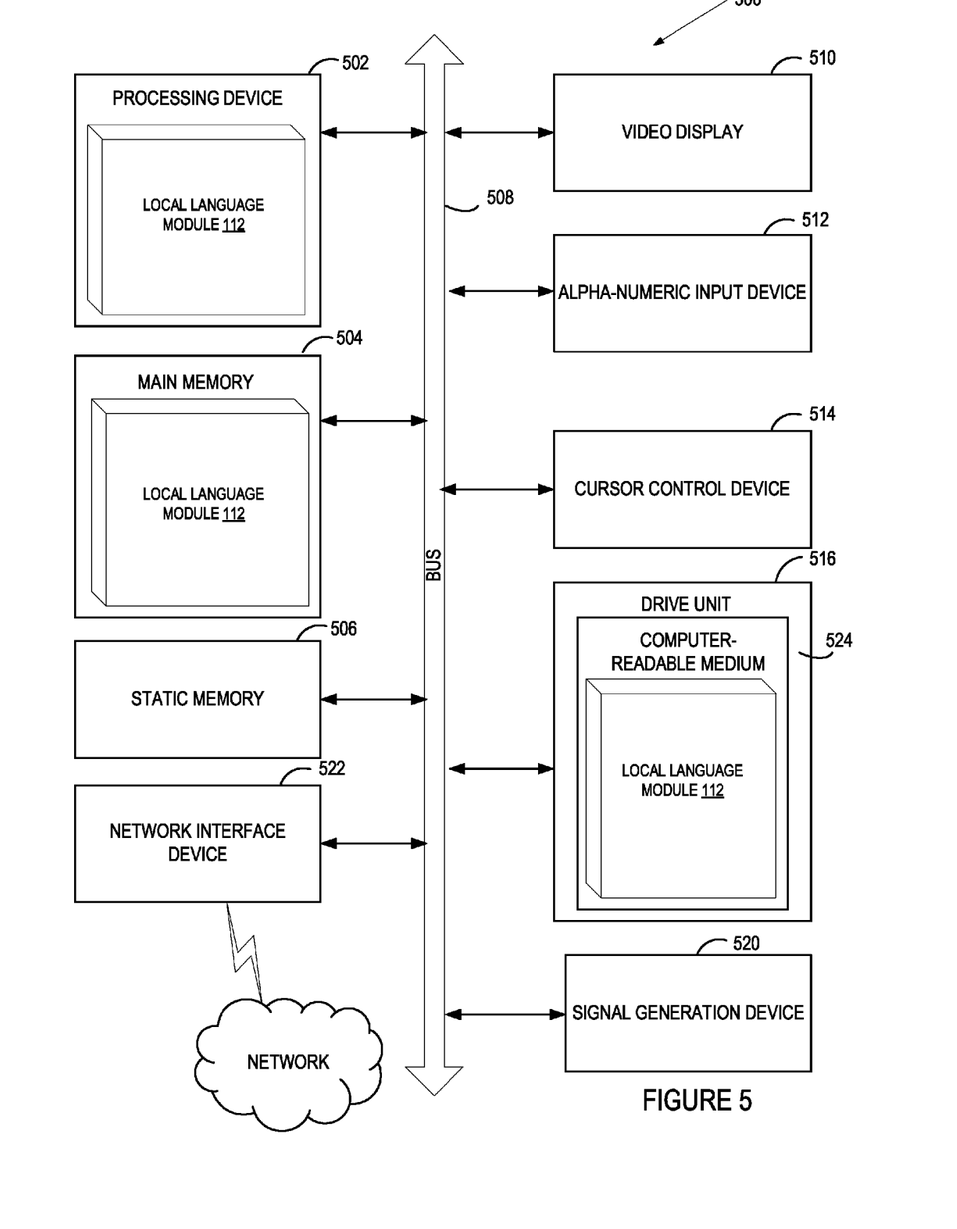
FIG. 5 illustrates a local language content delivery system, according to embodiments of the present invention.

FIG. 5 illustrates an exemplary language services system 500 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary language services system 500 includes a processing system (processing device) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The local language services server 102 in FIG. 1 may comprise processing device 502 configured to perform the operations and steps discussed herein, including, for example, execution of the local language module 112.

The language services system 500 may further include a network interface device 522. The language services system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of language services server 102) embodying any one or more of the methodologies or functions described herein. The instructions of the language services server 102 may also reside, completely or at least partially, within the main memory 504 and/or within the processing device 502 during execution thereof by the language services system 400, the main memory 504 and the processing device 502 also constituting computer-readable media. The instructions of the language services server 102 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "providing", "caching", "determining", "sending", "utilizing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device of a first server from a web service provided by a web server, a request comprising:
   a locale identifier identifying a location of a user device interacting with the web service; and
   user-inputted content received by the web service from the user device, wherein the request is generated by the web service in response to receipt of the user-inputted content;
   identifying, by the processing device of the first server, a language parameter in view of the locale identifier, wherein the language parameter comprises a file associated with a language relating to the location of the user device;
   identifying, by the processing device of the first server, a content presentation engine in view of the language parameter;
   caching by the processing device of the first server, the language parameter and the content presentation engine to a data store of the user device, the content presentation engine to render the user-inputted content on the user device according to the language parameter; and utilizing the content presentation engine to render the user-inputted content in the language.

2. The method of claim 1, wherein the request further comprises an application identifier.

3. The method of claim 2, further comprising identifying a style parameter in view of the application identifier.

4. The method of claim 3, wherein the style parameter comprises font information.

5. The method of claim 1, wherein the locale identifier identifies a location of the user device.

6. The method of claim 1, wherein the language parameter comprises at least one of a local language file, a grammar rule, or a formulation rule.

7. The method of claim 1, wherein the request further comprises application content.

8. The method of claim 1, further comprising providing at least one of a font file or a keyboard layout file to the user device.

9. A non-transitory computer readable storage medium comprising instructions that, when executed by a processing device, cause the processing device to:
   receive, by the processing device of a first server from a web service provided by a web server, a request comprising:
      a locale identifier identifying a location of a user device interacting with the web service; and
      user-inputted content received by the web service from the user device, wherein the request is generated by the web service in response to receipt of the user-inputted content;
   identify, by the processing device of the first server, a language parameter in view of the locale identifier, wherein the language parameter comprises a file associated with a language relating to the location of the user device;
   identify, by the processing device of the first server, a content presentation engine in view of the language parameter;
   cache, by the processing device of the first server, the language parameter and the content presentation engine to a data store of the user device, the content presentation engine to render the user-inputted content to the user device according to the language parameter; and
   utilize the content presentation engine to render the user-inputted content in the language.

10. A computer system comprising:
   a memory; and
   a processing device, operatively coupled to the memory, the processing device to:
      receive, by the processing device of a first server from a web service provided by a web server, a request comprising:
         a locale identifier identifying a location of a user device interacting with the web service, and
         user-inputted content received by the web service from a user device, wherein the request is generated by the web service in response to receipt of the user-inputted content;
      identify a language parameter in view of the locale identifier, wherein the language parameter comprises a file associated with a language relating to the location of the user device;
      identify a content presentation engine in view of the language parameter;
      cache the language parameter and the content presentation engine to a data store of the user device, the content presentation engine to render the user-inputted content on the user device according to the language parameter; and
      utilize the content presentation engine to render the user-inputted content in the language.

* * * * *